(12) United States Patent
Arekapudi et al.

(10) Patent No.: US 8,990,544 B2
(45) Date of Patent: Mar. 24, 2015

(54) METHOD AND APPARATUS FOR USING A PREVIOUS COLUMN POINTER TO READ ENTRIES IN AN ARRAY OF A PROCESSOR

(75) Inventors: Srikanth Arekapudi, Sunnyvale, CA (US); Shloke Hajela, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 562 days.

(21) Appl. No.: 13/333,125

(22) Filed: Dec. 21, 2011

(65) Prior Publication Data

US 2013/0166876 A1 Jun. 27, 2013

(51) Int. Cl.
*G06F 12/00* (2006.01)
*G06F 7/02* (2006.01)

(52) U.S. Cl.
CPC . *G06F 7/02* (2013.01); *G06F 12/00* (2013.01)
USPC ........................................................ 712/217

(58) Field of Classification Search
CPC combination set(s) only.
See application file for complete search history.

(56) References Cited

U.S. PATENT DOCUMENTS

| 5,027,326 | A | * | 6/1991 | Jones ............................ 365/221 |
| 5,521,876 | A | * | 5/1996 | Hattori et al. ................. 365/221 |
| 6,049,223 | A | * | 4/2000 | Lytle et al. ...................... 326/40 |
| 7,974,124 | B2 | * | 7/2011 | Chibvongodze et al. ........................ 365/185.05 |
| 2003/0053367 | A1 | * | 3/2003 | Condorelli et al. ........... 365/239 |
| 2008/0077771 | A1 | * | 3/2008 | Guttag et al. ................. 712/204 |
| 2008/0319939 | A1 | * | 12/2008 | Tarin ................................ 707/1 |
| 2009/0133023 | A1 | * | 5/2009 | Li et al. ......................... 718/102 |
| 2010/0131934 | A1 | * | 5/2010 | Kim et al. ..................... 717/137 |
| 2011/0116328 | A1 | * | 5/2011 | Gupta et al. ............. 365/189.12 |

\* cited by examiner

*Primary Examiner* — Eric Coleman
(74) *Attorney, Agent, or Firm* — Volpe and Koenig, P.C.

(57) ABSTRACT

A method and apparatus are described for using a previous column pointer to read a subset of entries of an array in a processor. The array may have a plurality of rows and columns of entries, and each entry in the subset may reside on a different row of the array. A previous column pointer may be generated for each of the rows of the array based on a plurality of bits indicating the number of valid entries in the subset to be read, the previous column pointer indicating whether each entry is in a current column or a previous column. The entries in the subset may be read and re-ordered, and invalid entries in the subset may be replaced with nulls. The valid entries and nulls may then be outputted.

19 Claims, 15 Drawing Sheets

PRN Array
135

| $P_{72}$ | $P_{73}$ | $P_{74}$ | $P_{75}$ | $P_{76}$ | $P_{77}$ | $P_{78}$ | $P_{79}$ | Row 8 |
| $P_{64}$ | $P_{65}$ | $P_{66}$ | $P_{67}$ | $P_{68}$ | $P_{69}$ | $P_{70}$ | $P_{71}$ | Row 7 |
| $P_{56}$ | $P_{57}$ | $P_{58}$ | $P_{59}$ | $P_{60}$ | $P_{61}$ | $P_{62}$ | $P_{63}$ | Row 6 |
| $P_{48}$ | $P_{49}$ | $P_{50}$ | $P_{51}$ | $P_{52}$ | $P_{53}$ | $P_{54}$ | $P_{55}$ | Row 5 |
| $P_{40}$ | $P_{41}$ | $P_{42}$ | $P_{43}$ | $P_{44}$ | $P_{45}$ | $P_{46}$ | $P_{47}$ | Row 4 |
| $P_{32}$ | $P_{33}$ | $P_{34}$ | $P_{35}$ | $P_{36}$ | $P_{36}$ | $P_{37}$ | $P_{39}$ | Row 3 |
| $P_{24}$ | $P_{25}$ | $P_{26}$ | $P_{27}$ | $P_{28}$ | $P_{29}$ | $P_{29}$ | $P_{31}$ | Row 2 |
| $P_{16}$ | $P_{17}$ | $P_{18}$ | $P_{19}$ | $P_{20}$ | $P_{21}$ | $P_{22}$ | $P_{23}$ | Row 1 |
| $P_{8}$ | $P_{9}$ | $P_{10}$ | $P_{11}$ | $P_{12}$ | $P_{13}$ | $P_{14}$ | $P_{15}$ | |
| $P_{0}$ | $P_{1}$ | $P_{2}$ | $P_{3}$ | $P_{4}$ | $P_{5}$ | $P_{6}$ | $P_{7}$ | |
| Col. 1 | Col. 2 | Col. 3 | Col. 4 | Col. 5 | Col. 6 | Col. 7 | Col. 8 | |

FIG. 4

METHOD AND APPARATUS FOR USING A PREVIOUS COLUMN POINTER TO READ ENTRIES IN AN ARRAY OF A PROCESSOR

FIELD OF INVENTION

This application is related to the design of a processor.

BACKGROUND

Dedicated pipeline queues have been used in multi-pipeline execution units of processors in order to achieve faster processing speeds. In particular, dedicated queues have been used for execution (EX) units having multiple EX pipelines that are configured to execute different subsets of a set of supported micro-instructions. Dedicated queuing has generated various bottlenecking problems and problems for the scheduling of microinstructions that required both numeric manipulation and retrieval/storage of data.

Processors are conventionally designed to process operations (Ops) that are typically identified by operation codes (OpCodes), (i.e., instruction codes). In the design of new processors, it is important to be able to process all of a standard set of Ops so that existing computer programs based on the standardized codes will operate without the need for translating Ops into an entirely new code base. Processor designs may further incorporate the ability to process new Ops, but backwards compatibility to older instruction sets is often desirable.

Execution of micro-instructions/Ops is typically performed in an execution unit of a processor. To increase speed, multi-core processors have been developed. Furthermore, to facilitate faster execution throughput, "pipeline" execution of Ops within an execution unit of a processor core is used. Cores having multiple execution units for multi-thread processing are also being developed. However, there is a continuing demand for faster throughput for processors.

One type of standardized set of Ops is the instruction set compatible with "x86" chips, (e.g., 8086, 286, 386, and the like), that have enjoyed widespread use in many personal computers. The micro-instruction sets, such as the "x86" instruction set, include Ops requiring numeric manipulation, Ops requiring retrieval and/or storage of data, and Ops that require both numeric manipulation and retrieval/storage of data. To execute such Ops, execution units within processors have included two types of pipelines: arithmetic logic pipelines ("EX pipelines") to execute numeric manipulations, and address generation (AG) pipelines ("AG pipelines") to facilitate load and store Ops.

In order to quickly and efficiently process Ops as required by a particular computer program, the program commands are decoded into Ops within the supported set of microinstructions and dispatched to the execution unit for processing. Conventionally, an OpCode is dispatched that specifies the Op/micro-instruction to be performed along with associated information that may include items such as an address of data to be used for the Op and operand designations.

Dispatched instructions/Ops are conventionally queued for a multi-pipeline scheduler queue of an execution unit. Queuing is conventionally performed with some type of decoding of a micro-instruction's OpCode in order for the scheduler queue to appropriately direct the instructions for execution by the pipelines with which it is associated within the execution unit.

The processing speed of the execution unit may be affected by the operation of any of its components. For example, any delay in scheduling of the instructions may adversely affect the overall speed of the execution unit.

SUMMARY OF EMBODIMENTS

A method and apparatus are described for using a previous column pointer to read a subset of entries of an array in a processor. The array may have a plurality of rows and columns of entries, and each entry in the subset may reside on a different row of the array. A previous column pointer may be generated for each of the rows of the array based on a plurality of bits indicating the number of valid entries in the subset to be read, the previous column pointer indicating whether each entry is in a current column or a previous column.

Each of the entries may include a physical register number (PRN). A row pointer may be used to indicate a first entry of the subset on a specific row of the array. The bits having a select logic value may be shifted together, and then the shifted bits may be rotated based on the row pointer. A new row pointer may be generated based on the rotated bits. The entries in the subset may be read and re-ordered, and invalid entries in the subset may be replaced with nulls. The valid entries and nulls may then be outputted.

A processor may include a decode unit configured to generate a plurality of bits, and an array having a plurality of rows and columns of entries, each entry in the subset residing on a different row of the array. A previous column pointer may be generated for each of the rows of the array based on the bits to indicate whether each entry is in a current column or a previous column.

A computer-readable storage medium may be configured to store a set of instructions used for manufacturing a semiconductor device. The semiconductor device may comprise the decode unit and the array described above. The instructions may be Verilog data instructions or hardware description language (HDL) instructions.

A computer-readable storage medium may be configured to store data for using a previous column pointer to read a subset of entries of an array having a plurality of rows and columns of entries where each entry in the subset resides on a different row of the array, by generating a previous column pointer for each of the rows of the array based on a plurality of bits indicating the number of valid entries in the subset to be read, and the previous column pointer indicating whether each entry is in a current column or a previous column.

BRIEF DESCRIPTION OF THE DRAWINGS

A more detailed understanding may be had from the following description, given by way of example in conjunction with the accompanying drawings wherein:

FIG. 4 shows an example of the configuration of a PRN array having 80 entries;

DETAILED DESCRIPTION OF EMBODIMENTS

Figure 1:
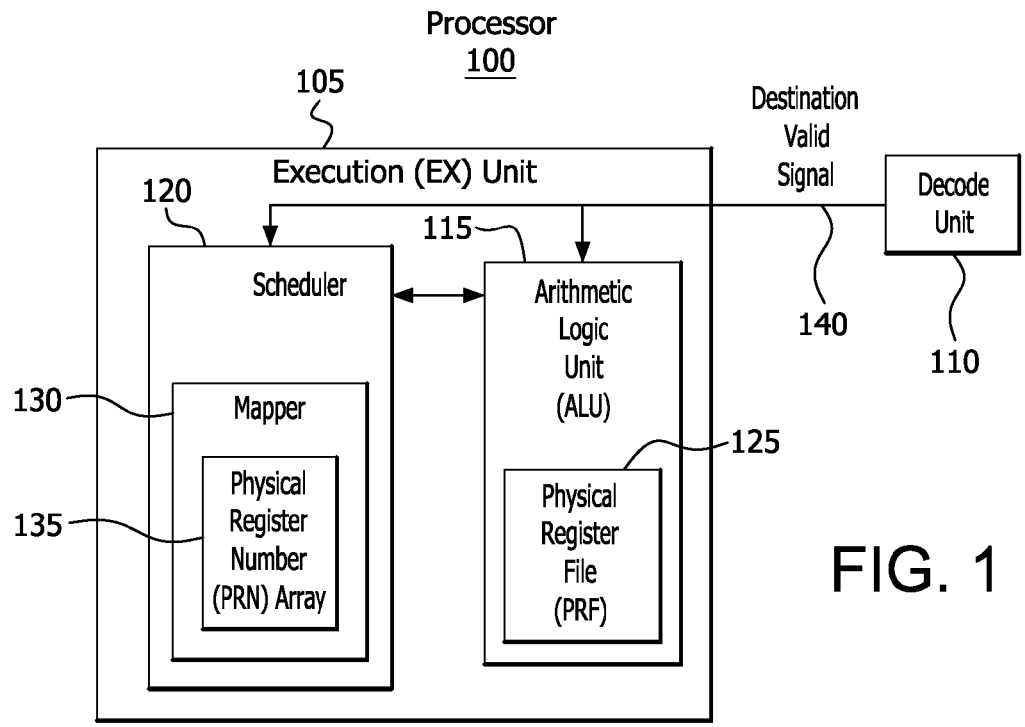
FIG. 1 shows an example block diagram of a processor (e.g., a central processing unit (CPU)) including an execution (EX) unit that is configured to read a physical register number (PRN) array.

FIG. 1 shows an example block diagram of a processor 100, (e.g., a central processing unit (CPU)), including an execution (EX) unit 105 and a decode unit 110. The EX unit 105 may include an arithmetic logic unit (ALU) 115 and a scheduler 120. The ALU 115 may include a physical register file (PRF) 125. The scheduler 120 may include a mapper 130 having a physical register number (PRN) array 135, (otherwise known as a freelist macro).

The EX unit 105 is responsible for all integer execution, (including AG), as well as coordination of all instruction retirement and exception handling. The EX unit 105 may be configured to translate all architectural source registers to their current physical registers, and to assign new physical registers to architectural destination registers through a rename and mapping process, using the mapper 130 and the PRN array 135. Physical tags, (i.e., indexes into the PRF 125), may be produced that are used for all subsequent dependency tracking. The PRF entries may be allocated and deallocated out-of-order. Therefore, the free entries need to be tracked in the PRN array 135 (i.e., a freelist structure). The PRN array 135 may store free PRF entries and provide free PRNs to rename destination registers. The PRN array 135 may be a first-in first-out (FIFO) queue that is read in-order with a read pointer. Up to eight (8) PRNs may be read out each cycle of the processor 100. There is a write pointer at the other end of the queue where newly freed PRNs are written. Up to eight (8) newly freed PRNs may be written each cycle.

Eight (8) PRNs may be read every cycle of the processor 100, but they all may not come from the same column. The PRN array 135, (i.e., a freelist macro), may be an array which stores 8 (rows)×10 (columns)=80 free PRNs. Each PRN may include 8 bits.

The EX unit 105 may receive a destination valid signal 140 (8 bits) from the decode unit 110, in a pipe stage, which indicates the number of destinations that were valid in four (4) dispatch packets (2 bits each). A dispatch valid signal (not shown) may be received one cycle later in a mapping pipe stage which indicates whether 1, 2, 3 or 4 dispatch packets were valid. Both these valid signals may be used to determine where (which row) to start reading the PRNs in the cycle. Thus, instead of just using row and column pointers, an additional pointer is needed, (i.e., a previous column pointer), which determines whether it is necessary to read from a current column or a previous column for a particular row.

The scheduler queue 120 determines the order that operations (Ops)/instructions are executed by the EX unit 105. The mapper 130 maps architectural registers, (designated by architectural register numbers (ARNs), to physical registers, (designated by PRNs). The PRN array 135 is used to determine which of the PRNs in the PRF 125 are "free", (i.e., valid and available for use). At the beginning of each cycle of the processor 100, the decode unit 115 sends a destination valid signal 140 to the ALU 115 and the scheduler 120 that indicates which of a subset of the PRNs stored in entries of the PRF 125 are valid and invalid. As an example, the destination valid signal 140 may have 8 bits, whereby each bit having a logic 1 value indicates a valid PRN, and each bit having a logic 0 value indicates an invalid PRN. The number of valid PRNs indicated by each destination valid signal 140 is provided to the PRN array 135 in the mapper 130 to determine the number of entries in the subset that are valid to be used.

Figure 2:
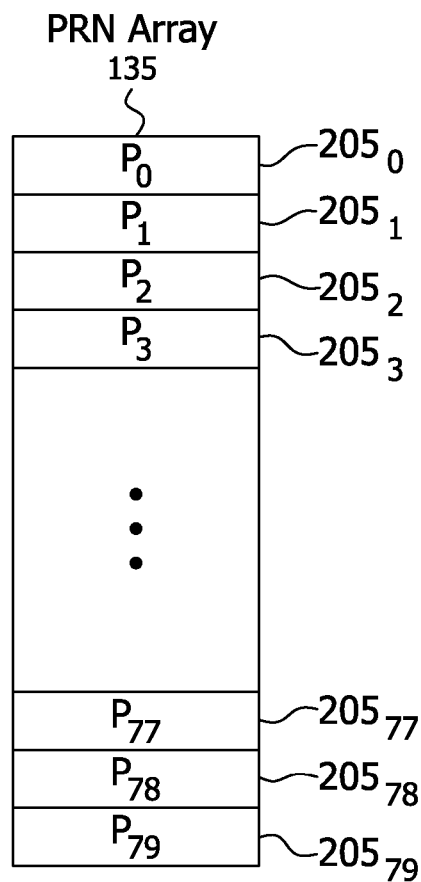
FIG. 2 shows an example configuration of a PRN array including a plurality of 8-bit entries.

As an example shown in FIG. 2, the PRN array 135 may include 80 entries $205_0$, $205_1$, $205_2$, $205_3$, ..., $205_{77}$, $205_{78}$ and $205_{79}$, each including a respective eight (8)-bit PRN $P_0$, $P_1$, $P_2$, $P_3$, ..., $P_{77}$, $P_{78}$ and $P_{79}$, which may be considered for reading at a rate of eight (8) entries per cycle of the processor 100.

Figure 3:
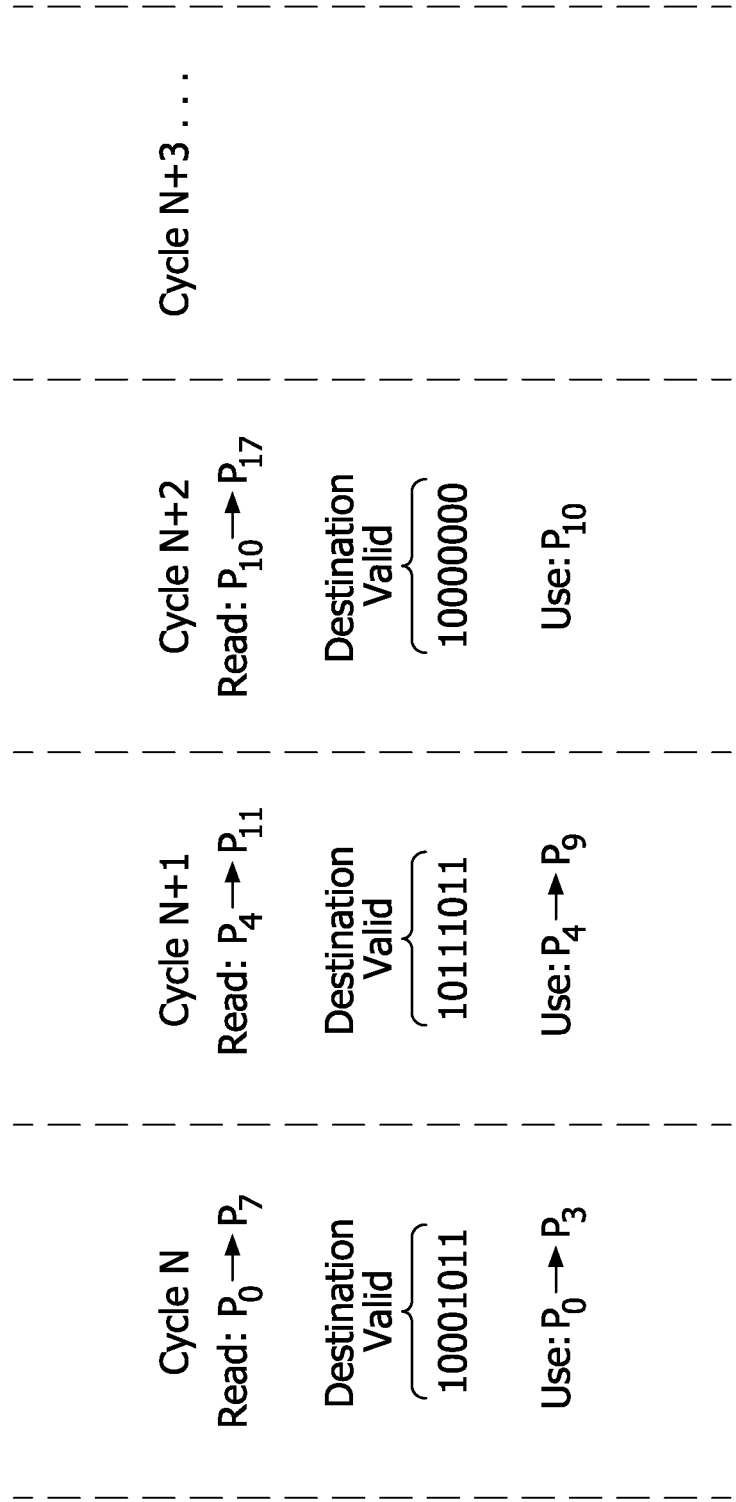
FIG. 3 shows an example of reading the PRN array of the processor of FIG. 1 based on a destination valid signal received for each cycle of the processor.

FIG. 3 shows an example of reading the PRN array 135 in the processor 100 of FIG. 1 based on the destination valid signal 140 received for each cycle of the processor 100. As shown in FIG. 3, in cycle N of the processor 100, the PRNs $P_0$-$P_7$ in the PRN 135 are considered for reading. However, in this example, the destination valid signal 140 having a value "10001011" indicates that only four (4) PRNs are valid to be used, and thus only PRNs $P_0$-$P_3$ are used in cycle N, and PRNs $P_4$-$P_7$ were not used because they were considered to be invalid. In cycle N+1 of the processor 100, the PRNs $P_4$-$P_{11}$ in the PRN array 135 are considered for reading. However, in this example, the destination valid signal 140 having a value "10111011" indicates that six (6) PRNs are valid to be used, and thus PRNs $P_4$-$P_9$ are used in cycle N+1, and PRNs $P_{10}$ and $P_{11}$ were not used because they were considered to be invalid. In cycle N+2 of the processor 100, the PRNs $P_{11}$-$P_{17}$ in the PRN array 135 are considered for reading. However, in this example, the destination valid signal 140 having a value "10000000" indicates that only one (1) PRN is valid to be used, and thus PRN $P_{10}$ is used in cycle N+2, and PRNs $P_{11}$-$P_{17}$ were not used because they were considered to be invalid. This process of reading PRNs may continue until all of the PRNs have been read.

One relatively simple way to implement this process would be to use a PRN array with eight (8) read ports and 80 entries. However, this may require a relatively large silicon area on the chip of the processor 100. Furthermore, undesired timing issues and a reduction in the speed of the processor 100 may result.

FIG. 4 shows an example of the configuration of a PRN array 135 having 80 entries, with 8 rows and 10 columns. Each entry stores a PRN ($P_0$-$P_7$).

Figure 5:
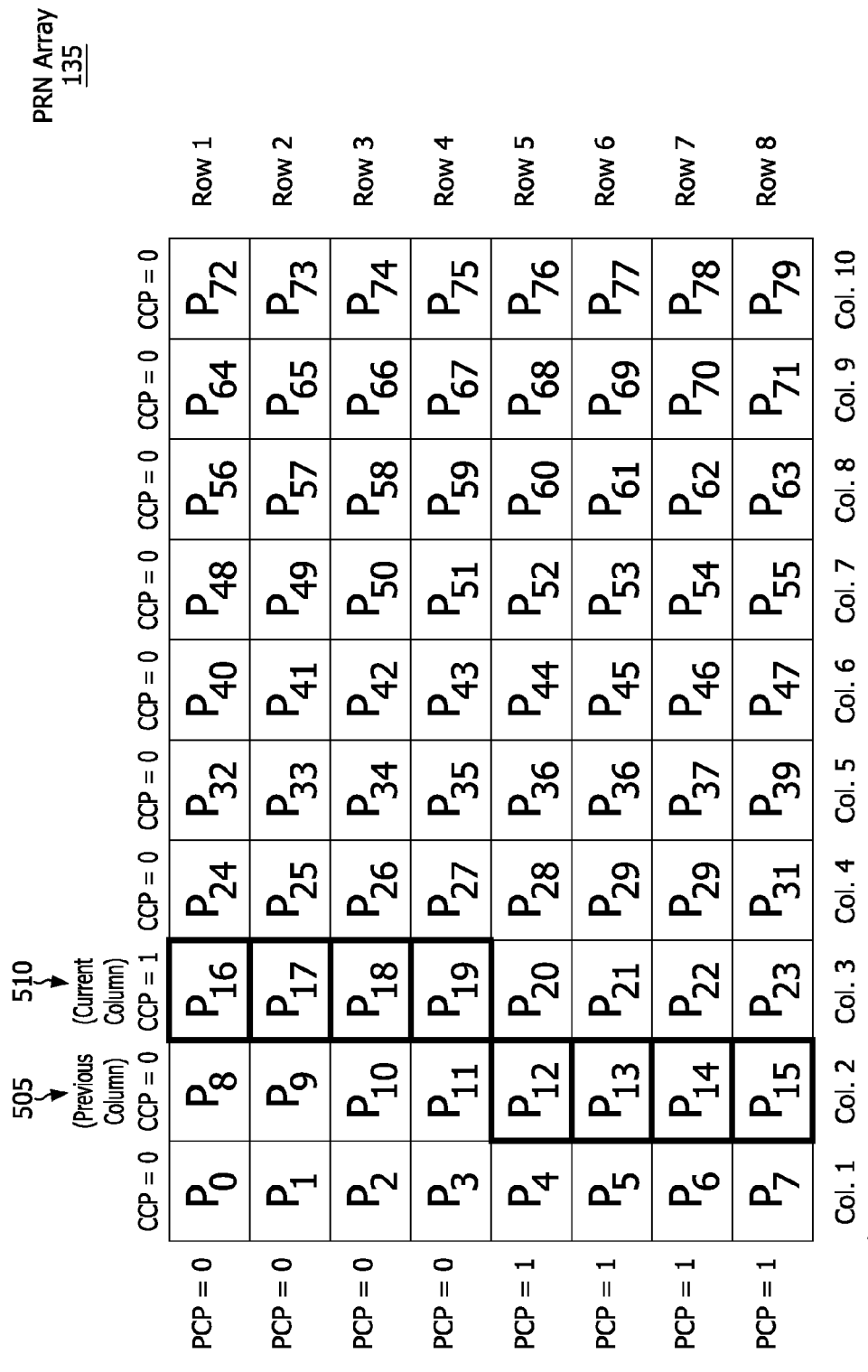
FIG. 5 shows an example of reading 4 PRNs in a current column and 4 PRNs in a previous column of the PRN array.

FIG. 5 shows an example of reading eight (8) PRNs at a time. Assuming that, previously, an attempt was made to read PRNs $P_{10}$-$P_{17}$, but only two PRNs were determined to be valid (e.g., the destination valid signal was "10010000"), only $P_{10}$ and $P_{11}$ would be read in the current cycle. Since $P_{10}$ is the first PRN to be read and it resides on the third row of the PRN array 135, a row pointer is set to row 3 using a one-hot 8-bit indicator "00100000". In the next cycle, an attempt to read PRNs $P_{12}$-$P_{19}$ is made, whereby four (4) of the PRNs are in a previous column 505 of the PRN 135 and the other four (4) PRNs are in a current column 510 of the PRN array 135. A current column pointer (CCP) is set to column 3, (e.g., using a one-hot 10-bit indicator "0010000000"), a previous column pointer (PCP) is set to 0 for rows 1-4 because the PRNs $P_{16}$-$P_{19}$ are in the current column 510, the PCP is set to a logic 1 for rows 5-8 because the PRNs $P_{12}$-$P_{15}$ are in the previous column 505, and the row pointer is set to row 5, (e.g., using a one-hot 8-bit indicator "00001000").

Figure 6:
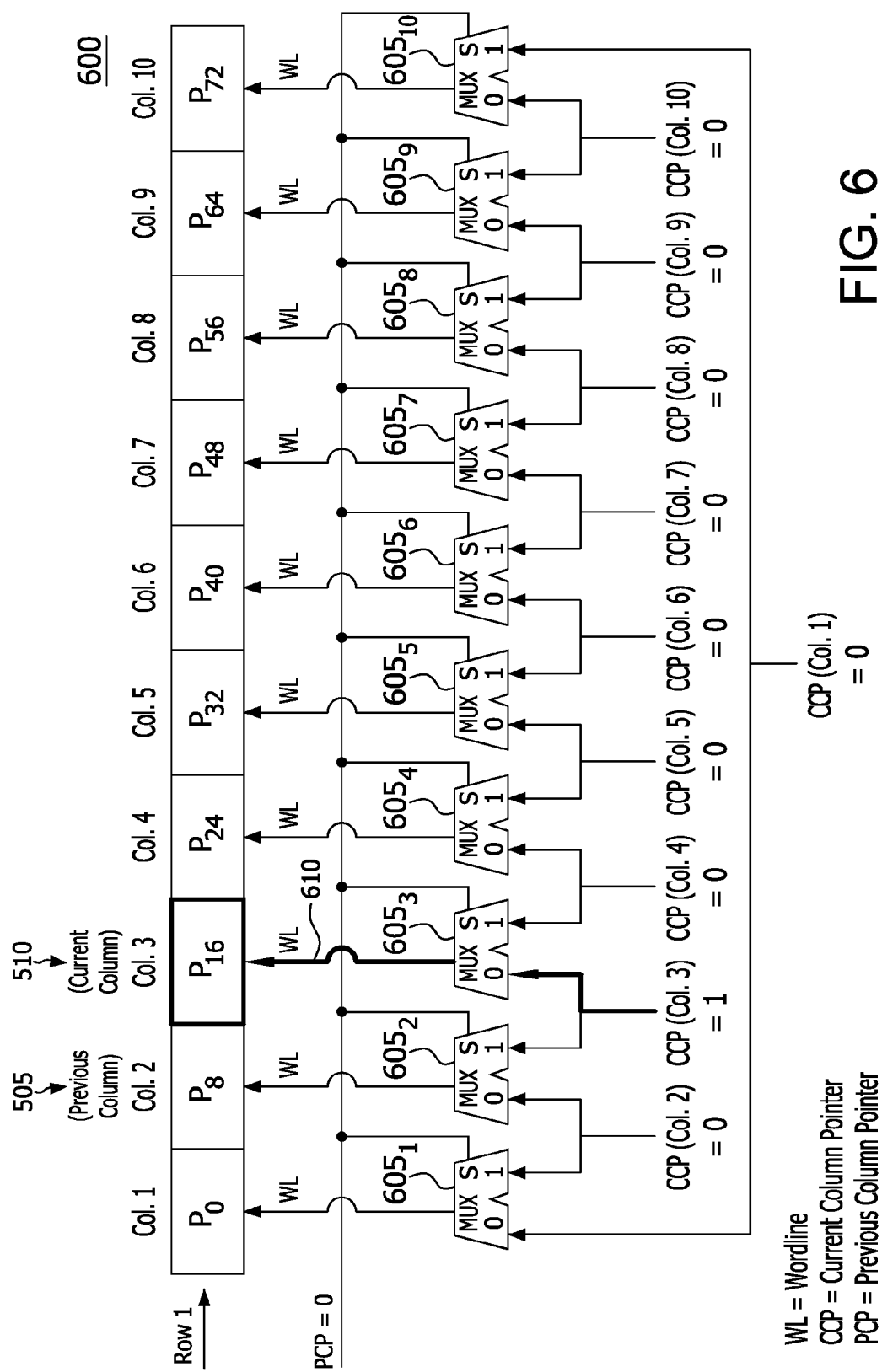
FIG. 6 shows an example circuit for reading a first PRN from a first row of the PRN array in a current (third) column.

FIG. 6 shows an example circuit 600 for reading a first PRN ($P_{16}$) from a first row of the PRN array 135 of FIG. 5 in the current (third) column 510. The circuit 600 may include a plurality of multiplexers (MUXes) $605_1$-$605_{10}$, each being controlled by the PCP. Since the first PRN ($P_{16}$) is in the current column 510, the PCP is set to a logic 0 and the CCP is set to column 3, the first PRN ($P_{16}$) is read via the logic 0 input of MUX $605_3$ and a wordline (WL) 610.

Figure 7:
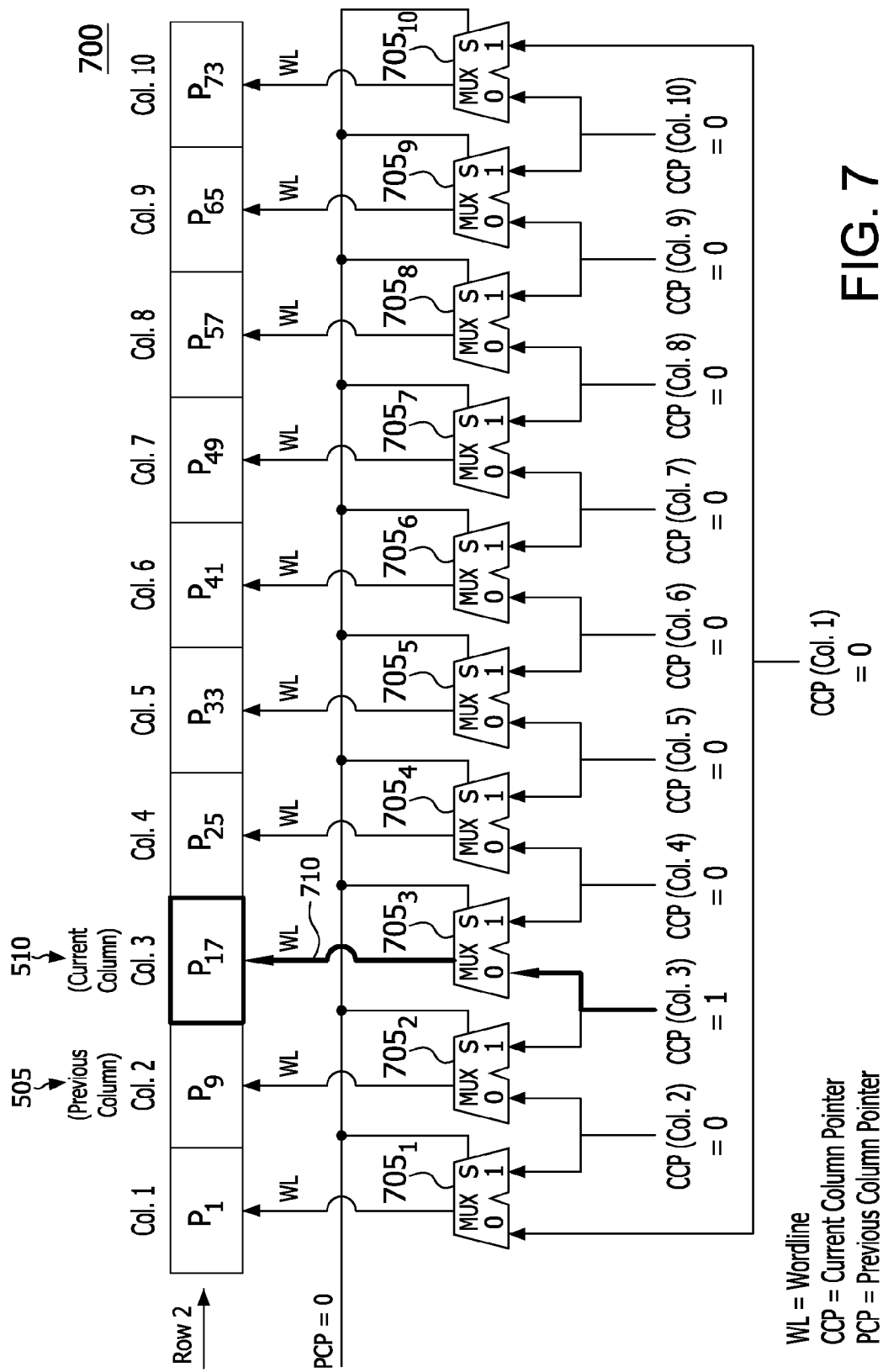
FIGS. 7-9 show example circuits for reading PRNs from the second, third and fourth rows of the PRN array in the current (third) column.

FIG. 7 shows an example circuit 700 for reading a second PRN ($P_{17}$) from a second row of the PRN array 135 of FIG. 5 in the current (third) column 510. The circuit 700 may include a plurality of MUXes $705_1$-$705_{10}$, each being controlled by the PCP. Since the second PRN ($P_{17}$) is in the current column 510, the PCP is set to a logic 0 and the CCP is set to column 3, the second PRN ($P_{17}$) is read via the logic 0 input of MUX $705_3$ and a WL 710.

Figure 8:
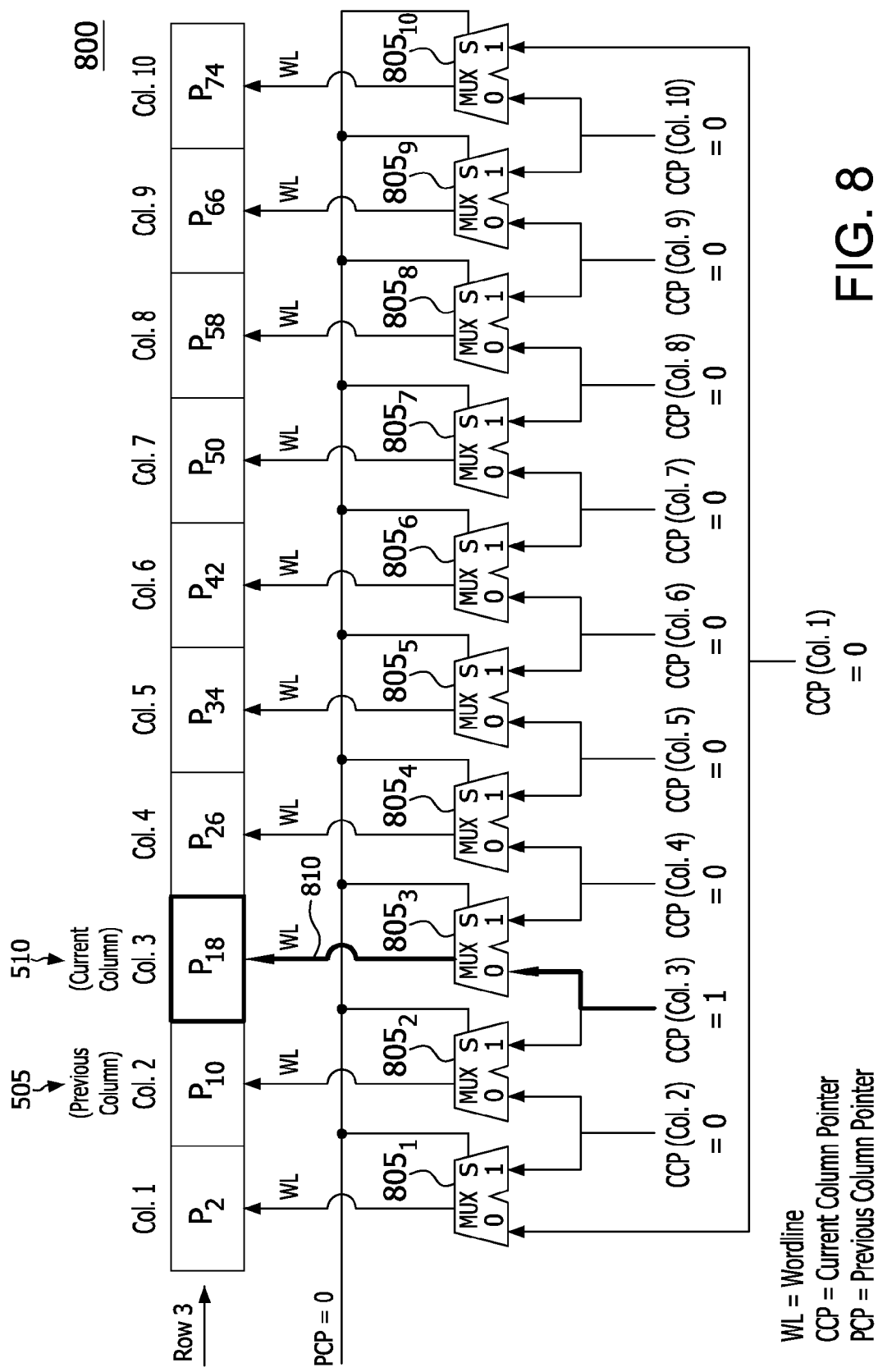

FIG. 8 shows an example circuit 800 for reading a third PRN ($P_{18}$) from a third row of the PRN array 135 of FIG. 5 in the current (third) column 510. The circuit 800 may include a plurality of MUXes $805_1$-$805_{10}$, each being controlled by the PCP. Since the second PRN ($P_{18}$) is in the current column 510, the PCP is set to a logic 0 and the CCP is set to column 3, the third PRN ($P_{18}$) is read via the logic 0 input of MUX $805_3$ and a WL 810.

Figure 9:
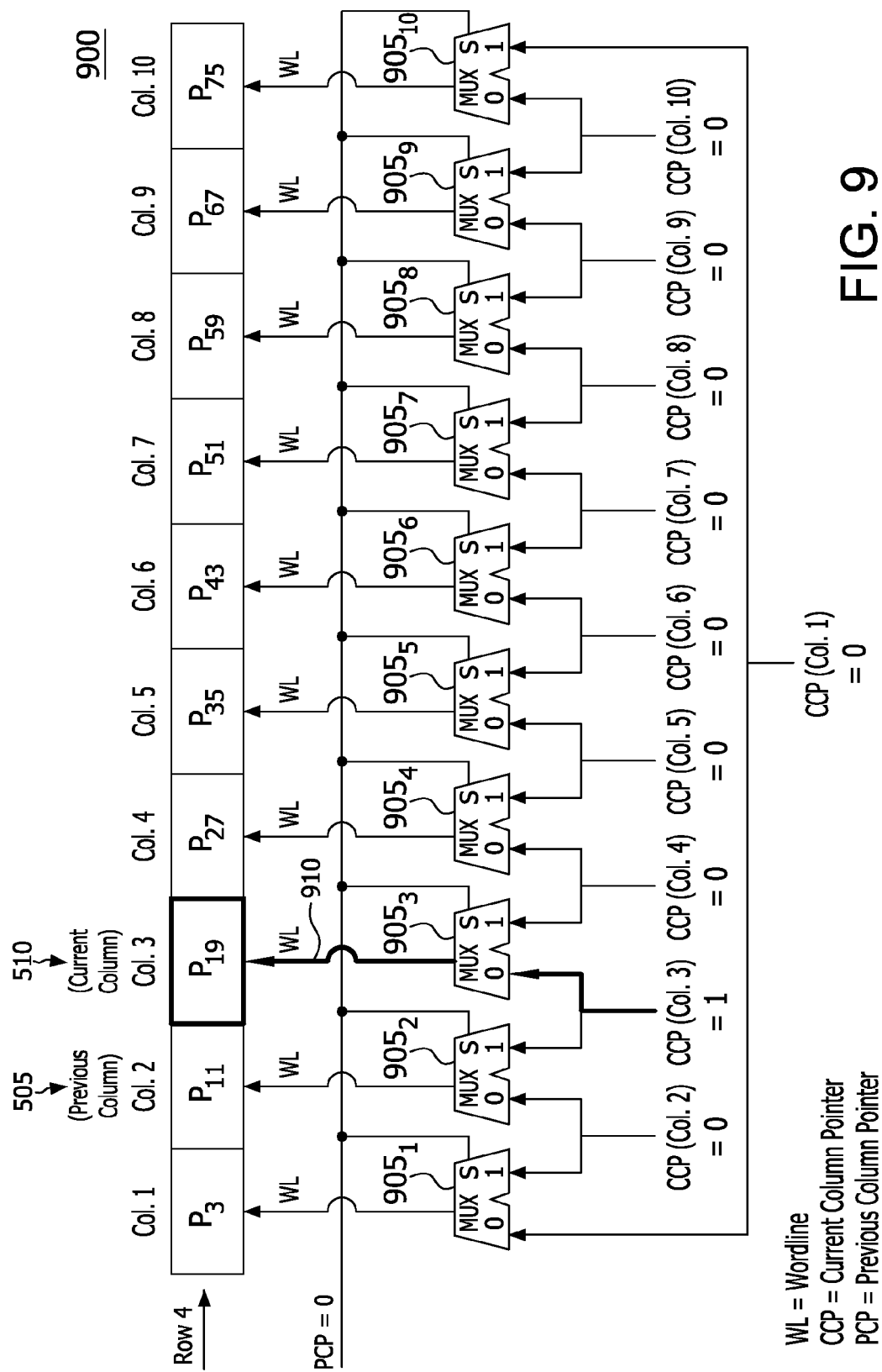

FIG. 9 shows an example circuit 900 for reading a fourth PRN ($P_{19}$) from a fourth row of the PRN array 135 of FIG. 5 in the current (third) column 510. The circuit 900 may include a plurality of MUXes $905_1$-$905_{10}$, each being controlled by the PCP. Since the fourth PRN ($P_{19}$) is in the current column 510, the PCP is set to a logic 0 and the CCP is set to column 3, the fourth PRN ($P_{19}$) is read via the logic 0 input of MUX $905_3$ and a WL 910.

Figure 10:
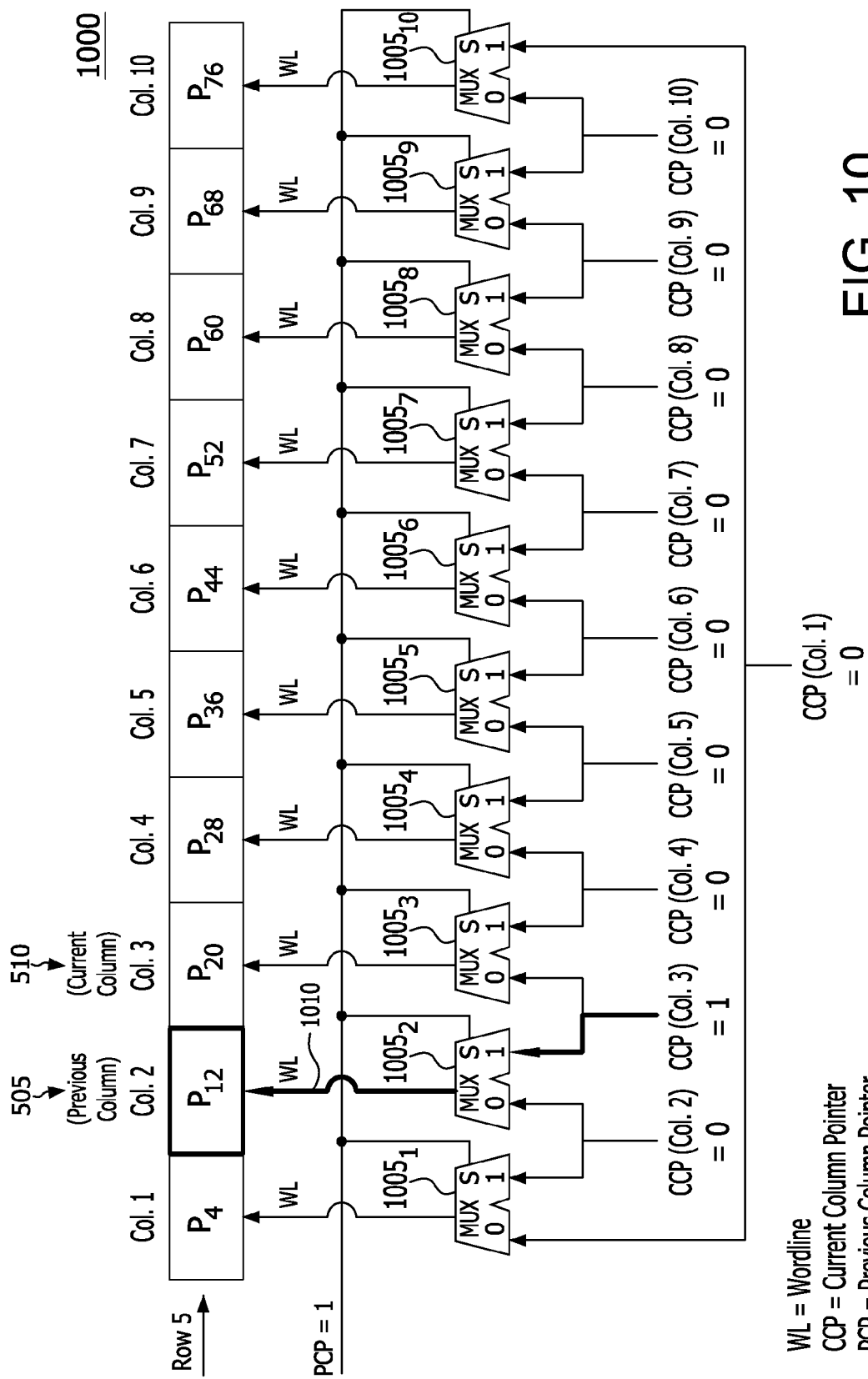
FIGS. 10-13 show example circuits for reading PRNs from the fifth, sixth, seventh and eighth rows of the PRN array in a previous (second) column when a previous current pointer is activated.

FIG. 10 shows an example circuit 1000 for reading a fifth PRN ($P_{12}$) from a fifth row of the PRN array 135 of FIG. 5 in the previous (second) column 505. The circuit 1000 may include a plurality of MUXes $1005_1$-$1005_{10}$, each being controlled by the PCP. Since the fifth PRN ($P_{12}$) is in the previous column 505, the PCP is set to a logic 1 and the CCP remains set to column 3, the fifth PRN ($P_{12}$) is read via the logic 1 input of MUX $1005_2$ and a WL 1010.

Figure 11:
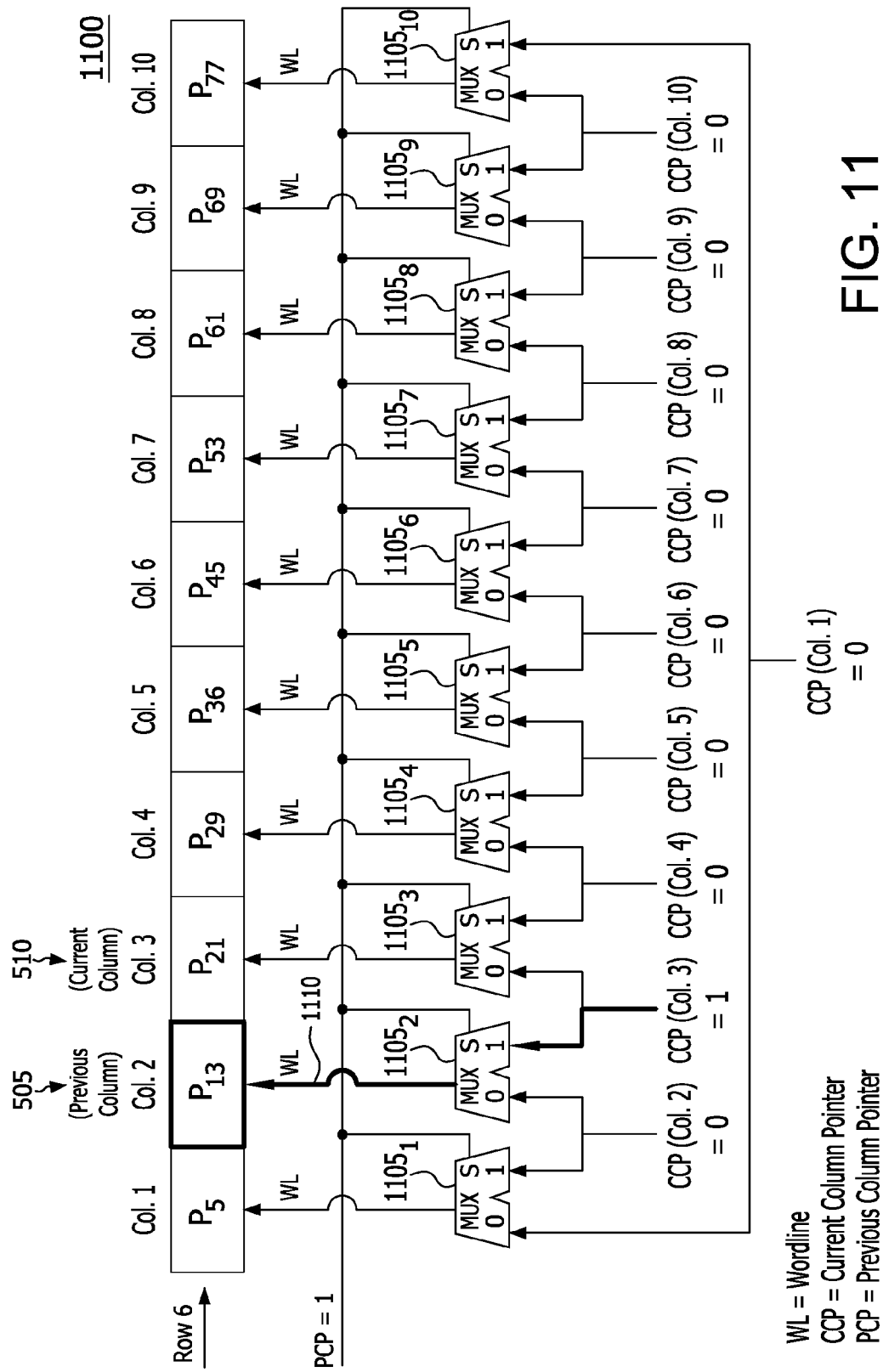

FIG. 11 shows an example circuit 1100 for reading a sixth PRN ($P_{13}$) from a sixth row of the PRN array 135 of FIG. 5 in the previous (second) column 505. The circuit 1100 may include a plurality of MUXes $1105_1$-$1105_{10}$, each being controlled by the PCP. Since the sixth PRN ($P_{13}$) is in the previous column 505, the PCP is set to a logic 1 and the CCP remains set to column 3, the sixth PRN ($P_{13}$) is read via the logic 1 input of MUX $1105_2$ and a WL 1110.

Figure 12:
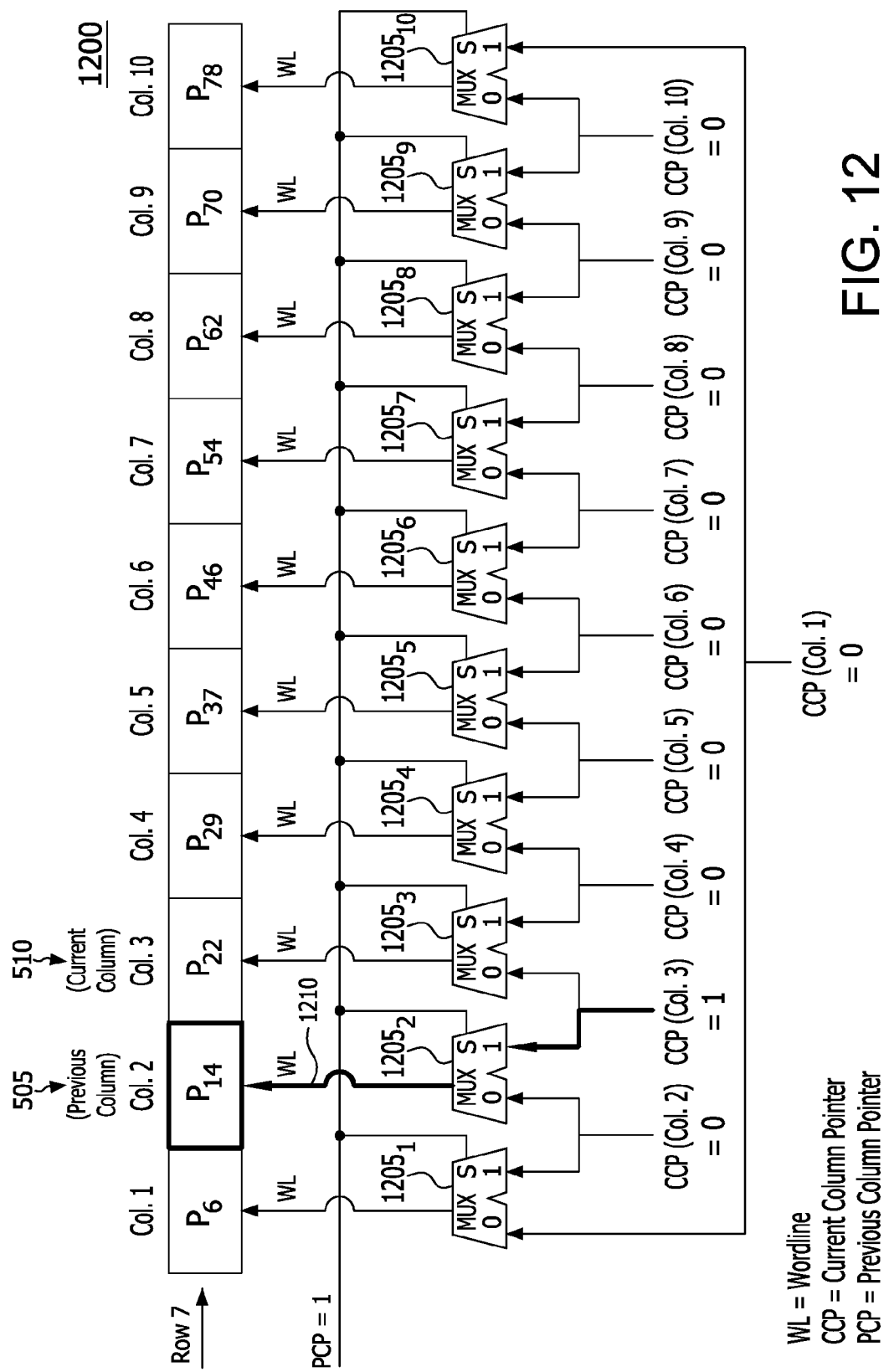

FIG. 12 shows an example circuit 1200 for reading a seventh PRN ($P_{14}$) from a seventh row of the PRN array 135 of FIG. 5 in the previous (second) column 505. The circuit 1200 may include a plurality of MUXes $1205_1$-$1205_{10}$, each being controlled by the PCP. Since the seventh PRN ($P_{14}$) is in the previous column 505, the PCP is set to a logic 1 and the CCP remains set to column 3, the seventh PRN ($P_{14}$) is read via the logic 1 input of MUX $1205_2$ and a WL 1210.

Figure 13:
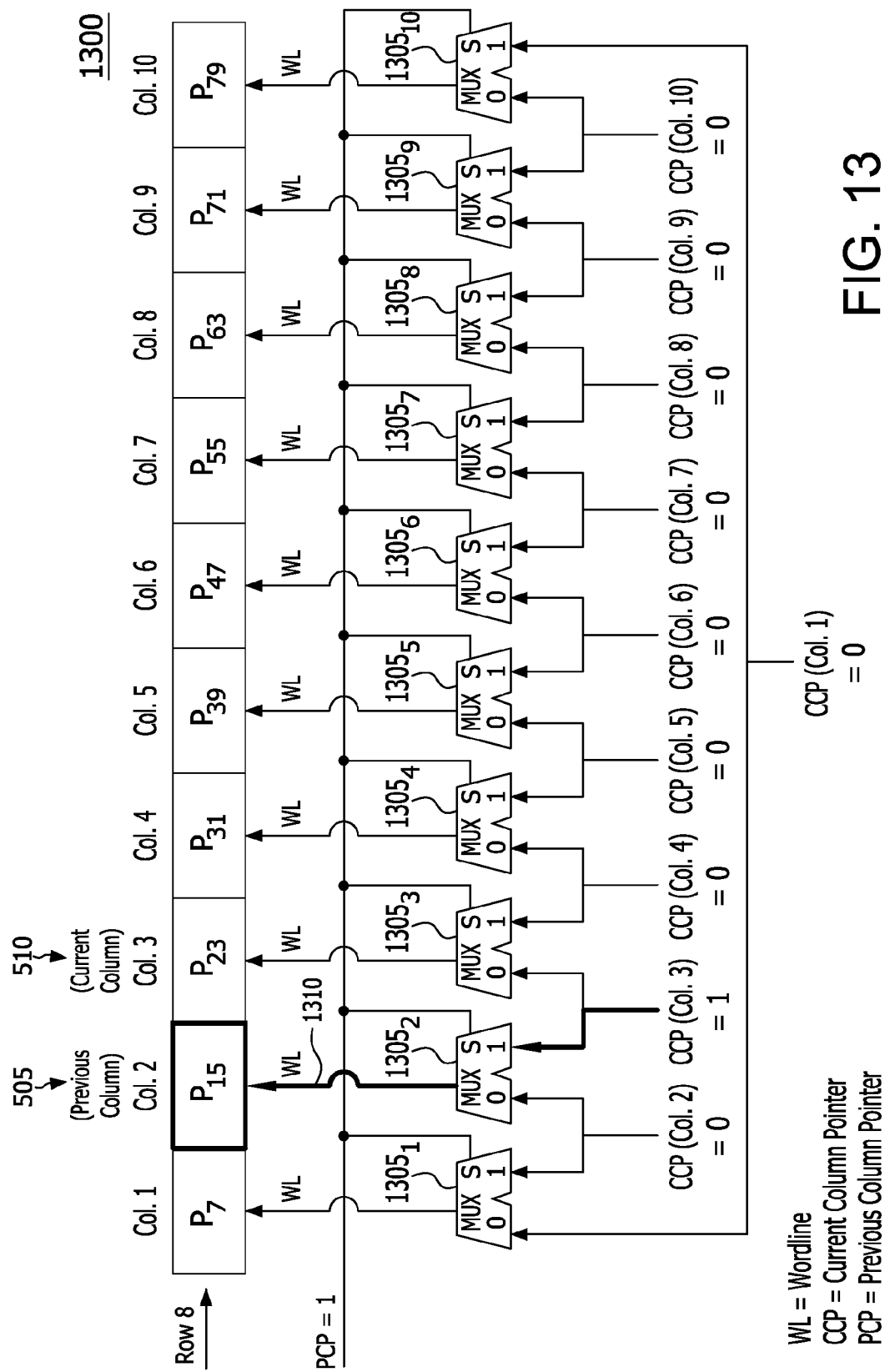

FIG. 13 shows an example circuit 1300 for reading an eighth PRN ($P_{15}$) from an eighth row of the PRN array 135 of FIG. 5 in the previous (second) column 505. The circuit 1300 may include a plurality of MUXes $1305_1$-$1305_{10}$, each being controlled by the PCP. Since the eighth PRN ($P_{15}$) is in the previous column 505, the PCP is set to a logic 1 and the CCP remains set to column 3, the eight PRN ($P_{15}$) is read via the logic 1 input of MUX $1305_2$ and a WL 1210.

Figure 14:
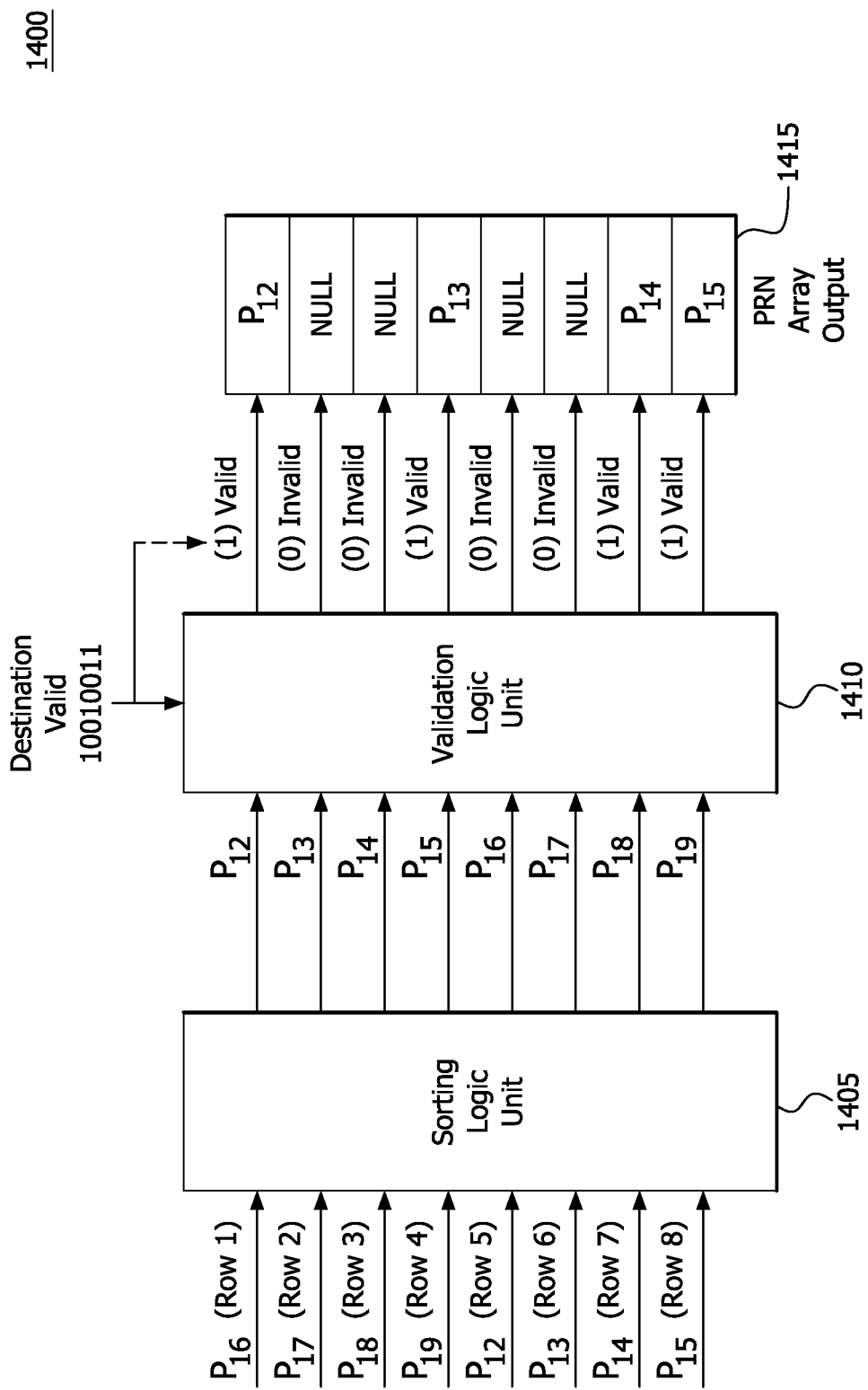
FIG. 14 is a block diagram of an optional PRN array processing circuit for generating an output of the PRN array.

FIG. 14 is a block diagram of an optional PRN array processing circuit 1400 for generating an output of the PRN array 135. The PRN array processing circuit 1400 may include a sorting logic unit 1405 and a validation logic unit 1410 used to generate a PRN array output 1415. The sorting logic unit 1405 receives the PRNs as they are read by the circuits 600-1300 of FIGS. 6-13 and re-orders the entries in the subset of PRNs such that they are in sequential order. The validation logic unit receives a destination valid signal and generates a PRN array output 1415 including valid PRNs and nulls.

Figure 15:
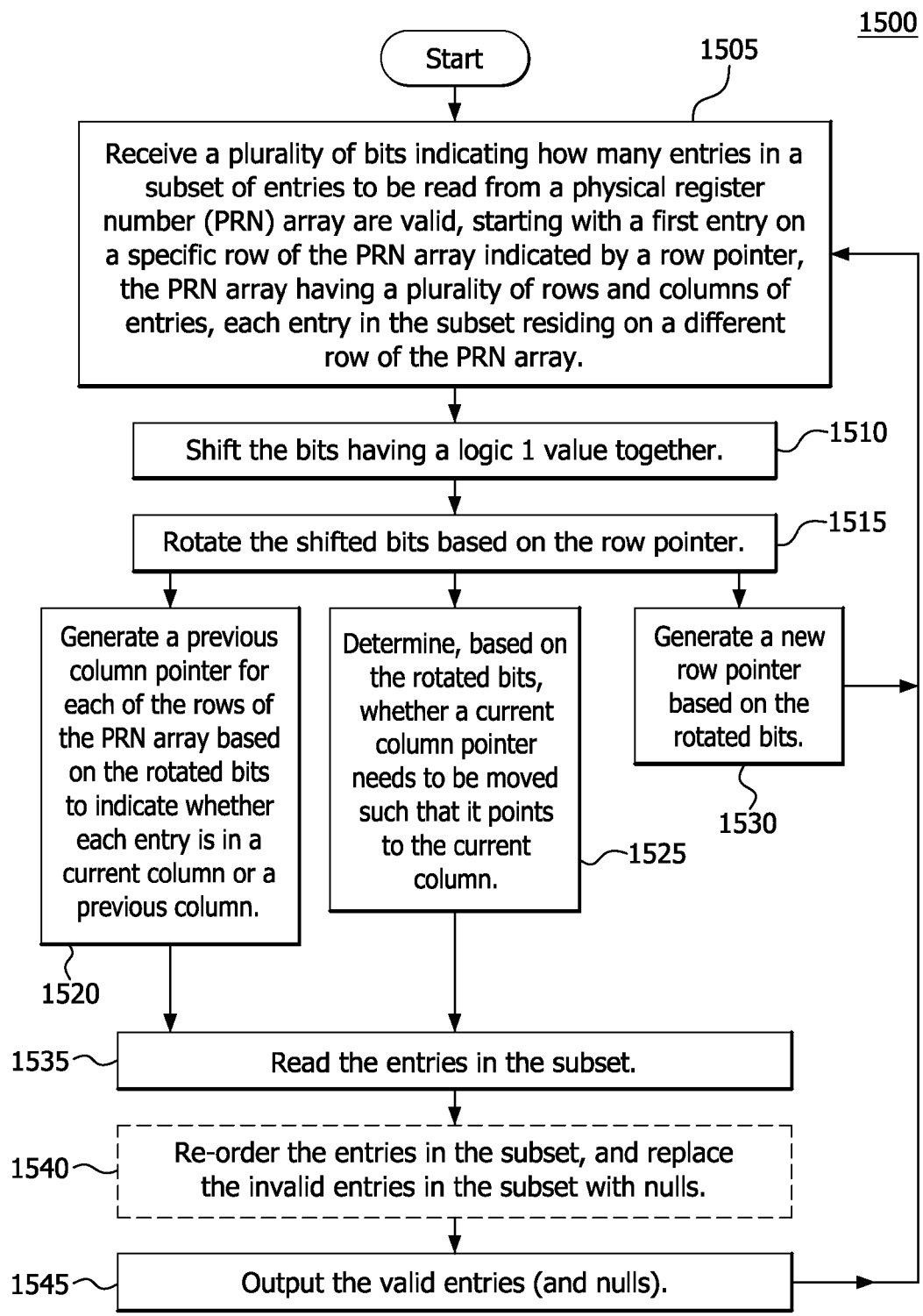
FIG. 15 is a flow diagram of a procedure for using a previous column pointer to read a subset of PRNs from an array.

FIG. 15 is a flow diagram of a procedure 1500 for using a previous column pointer to read a subset of PRNs from an array. A plurality of bits are received indicating how many entries in a subset of entries to be read from a PRN array are valid, starting with a first entry on a specific row of the PRN array indicated by a row pointer, the PRN array having a plurality of rows and columns, each entry in the subset residing on a different row of the PRN array (1505). The bits having a logic 1 value are shifted together (1510), and then the bits are rotated based on the row pointer (1515). A previous column pointer is generated for each of the rows of the PRN array based on the rotated bits to indicate whether each entry is in a current column or a previous column (1520). A determination is made, based on the rotated bits, whether a current column pointer needs to be moved such that it points to the current column (1525). A new row pointer is generated based on the rotated bits (1530). The steps 1520, 1525 and 1530 may be performed concurrently. The entries in the subset are then read (1535). Optionally, the entries in the subset may be re-ordered, and the invalid entries in the subset may be replaced with nulls (1540). The valid entries (and nulls) are then output from the PRN array (1545). The procedure 1500 may be continuously repeated starting with step 1505.

Figure 16:
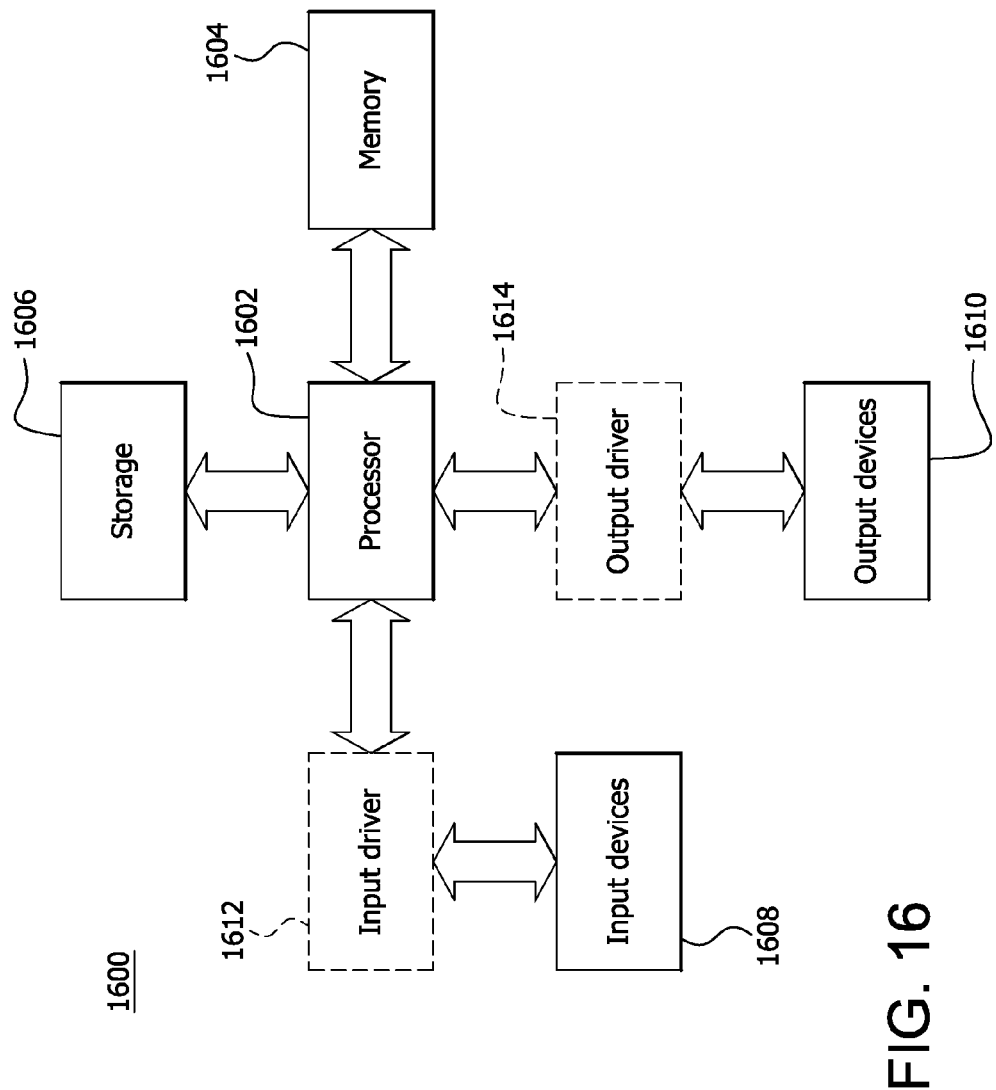
FIG. 16 is a block diagram of an example device in which one or more disclosed embodiments may be implemented.

FIG. 16 is a block diagram of an example device 1600 in which one or more disclosed embodiments may be implemented. The device 1600 may include, for example, a computer, a gaming device, a handheld device, a set-top box, a television, a mobile phone, or a tablet computer. The device 1600 includes a processor 1602, a memory 1604, a storage 1606, one or more input devices 1608, and one or more output devices 1610. The device 1600 may also optionally include an input driver 1612 and an output driver 1614. It is understood that the device 1600 may include additional components not shown in FIG. 16. The processor 1602 may be configured in a similar fashion to the processor 100 shown in FIG. 1.

The processor 1602 may include a central processing unit (CPU), a graphics processing unit (GPU), a CPU and GPU located on the same die, or one or more processor cores, wherein each processor core may be a CPU or a GPU. The memory 1604 may be located on the same die as the processor 1602, or may be located separately from the processor 1602. The memory 1604 may include a volatile or non-volatile memory, for example, random access memory (RAM), dynamic RAM, or a cache.

The storage 1606 may include a fixed or removable storage, for example, a hard disk drive, a solid state drive, an optical disk, or a flash drive. The input devices 1008 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 1610 may include a display, a speaker, a printer, a haptic feedback device, one or more lights, an antenna, or a network connection (e.g., a wireless local area network card for transmission and/or reception of wireless IEEE 802 signals).

The input driver 1612 communicates with the processor 1602 and the input devices 1608, and permits the processor 1602 to receive input from the input devices 1608. The output driver 1614 communicates with the processor 1602 and the output devices 1610, and permits the processor 1602 to send output to the output devices 1610. It is noted that the input driver 1612 and the output driver 1614 are optional components, and that the device 1600 will operate in the same manner is the input driver 1612 and the output driver 1614 are not present.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), an accelerated processing unit (APU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method for reading a subset of entries of an array in a processor, the array having a plurality of rows and columns of entries, each entry in the subset residing on a different row of the array, the method comprising:
   receiving an indication of a number of entries to be read from the array; tracking:
      a row pointer, indicating a row of a first entry in the subset to be read;
      a current column pointer, indicating a current column of the array; and
      a previous column pointer, indicating a previous column of the array; and
   reading the number of entries from the array, beginning with a first row of a column identified by the current column pointer,
   wherein:
      if the first entry in the subset to be read is in the previous column, then the previous column pointer for each of the rows in the previous column from the row pointer to an end of the previous column is set, to indicate that the rows from the previous column are read; and
      if the previous column pointer is not set for a row, then the row is read from the current column.

2. The method of claim 1, wherein each of the entries includes a physical register number (PRN).

3. The method of claim 1, further comprising:
   re-ordering the entries in the subset.

4. The method of claim 3, further comprising:
   replacing invalid entries in the subset with nulls, wherein an invalid entry is an entry in the subset that will not be read.

5. The method of claim 4 further comprising:
   outputting the valid entries and nulls.

6. The method of claim 1, wherein the reading includes:
   rotating the entries in the subset by using the row pointer, such that an entry identified by the row pointer is positioned first in the subset.

7. The method of claim 6, further comprising:
   generating a new row pointer based on the rotated bits.

8. The method of claim 6, further comprising:
   updating the current column pointer based on the rotated entries.

9. A processor, comprising:
   a hardware memory array having a plurality of rows and columns of entries, each entry in a subset of entries residing on a different row of the hardware memory array; and
   a decode unit in communication with the hardware memory array, the decode unit configured to:
      receive an indication of a number of entries to be read from the hardware memory array;
      track:
         a row pointer, indicating a row of a first entry in the subset to be read;
         a current column pointer, indicating a current column of the hardware memory array; and
         a previous column pointer, indicating a previous column of the hardware memory array; and
      read the number of entries from the hardware memory array, beginning with a first row of a column identified by the current column pointer,
      wherein:
         if the first entry in the subset to be read is in the previous column, then the previous column pointer for each of the rows in the previous column from the row pointer to an end of the previous column is set, to indicate that the rows from the previous column are read; and
         if the previous column pointer is not set for a row, then the row is read from the current column.

10. The processor of claim 9, wherein the decode unit is further configured to:
    rotate the entries in the subset by using the row pointer, such that an entry identified by the row pointer is positioned first in the subset.

11. The processor of claim 10, wherein a new row pointer is generated based on the rotated bits.

12. The processor of claim 9, wherein each of the entries includes a physical register number (PRN).

13. The processor of claim 9, further comprising:
    a sorting logic unit configured to re-order the entries in the subset.

14. The processor of claim 13, further comprising:
    a validation logic unit configured to:
       replace invalid entries in the subset with nulls, wherein an invalid entry is an entry in the subset that will not be read: and
       output the valid entries and nulls.

15. A non-transitory computer-readable storage medium storing a set of instructions for execution by a general purpose computer to read a subset of entries of an array in a processor, the array having a plurality of rows and columns of entries, each entry in the subset residing on a different row of the array, the set of instructions comprising:
- a receiving code segment for receiving an indication of a number of entries to be read from the array;
- a tracking code segment for tracking:
  - a row pointer, indicating a row of a first entry in the subset to be read;
  - a current column pointer, indicating a current column of the array; and
  - a previous column pointer, indicating a previous column of the array; and
- a reading code segment for reading the number of entries from the array, beginning with a first row of a column identified by the current column pointer,
- wherein:
  - if the first entry in the subset to be read is in the previous column, then the previous column pointer for each of the rows in the previous column from the row pointer to an end of the previous column is set, to indicate that the rows from the previous column are read; and
  - if the previous column pointer is not set for a row, then the row is read from the current column.

16. The computer-readable storage medium of claim 15, wherein the instructions are Verilog data instructions.

17. The computer-readable storage medium of claim 15, wherein the instructions are hardware description language (HDL) instructions.

18. A non-transitory computer-readable storage medium storing a set of instructions for execution by one or more processors to facilitate manufacture of a processor, the processor comprising:
- a hardware memory array having a plurality of rows and columns of entries, each entry in a subset of entries residing on a different row of the hardware memory array; and
- a decode unit in communication with the hardware memory array, the decode unit configured to:
  - receive an indication of a number of entries to be read from the hardware memory array;
  - track:
    - a row pointer, indicating a row of a first entry in the subset to be read;
    - a current column pointer, indicating a current column of the hardware memory array; and
    - a previous column pointer, indicating a previous column of the hardware memory array; and
  - read the number of entries from the hardware memory array, beginning with a first row of a column identified by the current column pointer,
  - wherein:
    - if the first entry in the subset to be read is in the previous column, then the previous column pointer for each of the rows in the previous column from the row pointer to an end of the previous column is set, to indicate that the rows from the previous column are read; and
    - if the previous column pointer is not set for a row, then the row is read from the current column.

19. The non-transitory computer-readable storage medium of claim 18, wherein the instructions are hardware description language (HDL) instructions.

* * * * *